US012755749B2

(12) United States Patent
Darcy et al.

(10) Patent No.: US 12,755,749 B2
(45) Date of Patent: Oct. 6, 2026

(54) SYSTEMS AND METHODS FOR ENHANCING AUDIO IN VARIED ENVIRONMENTS

(71) Applicant: Dolby Laboratories Licensing Corporation, San Francisco, CA (US)

(72) Inventors: Daniel Paul Darcy, San Francisco, CA (US); Xuemei Yu, Beijing (CN); Clara Y-Phuong Vo, San Jose, CA (US); Stewart Murrie, San Francisco, CA (US); Libin Luo, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 363 days.

(21) Appl. No.: 17/995,406

(22) PCT Filed: Apr. 2, 2021

(86) PCT No.: PCT/US2021/025507
§ 371 (c)(1),
(2) Date: Oct. 3, 2022

(87) PCT Pub. No.: WO2021/202956
PCT Pub. Date: Oct. 7, 2021

(65) Prior Publication Data

US 2023/0169989 A1 Jun. 1, 2023

Related U.S. Application Data

(60) Provisional application No. 63/125,132, filed on Dec. 14, 2020, provisional application No. 63/014,502, filed on Apr. 23, 2020.

(30) Foreign Application Priority Data

Apr. 2, 2020 (WO) ................ PCT/CN2020/083083

(51) Int. Cl.
*G10L 21/00* (2013.01)
*G06F 3/04847* (2022.01)
(Continued)

(52) U.S. Cl.
CPC ...... *G10L 21/0364* (2013.01); *G06F 3/04847* (2013.01); *G06F 3/165* (2013.01); *G10L 21/0324* (2013.01)

(58) Field of Classification Search
CPC . G10L 21/0364; G10L 21/0324; G10L 21/02; G10L 21/003; G10L 2021/02082;
(Continued)

(56) References Cited

U.S. PATENT DOCUMENTS

| | | | | |
|---|---|---|---|---|
| 6,122,611 A * | 9/2000 | Su | G10L 21/0364 | 704/E21.009 |
| 6,985,594 B1 * | 1/2006 | Vaudrey | G10L 21/0272 | 381/104 |

(Continued)

FOREIGN PATENT DOCUMENTS

| | | |
|---|---|---|
| CN | 102859592 A | 1/2013 |
| CN | 102947878 A | 2/2013 |

(Continued)

OTHER PUBLICATIONS

Mellor, David. "EQ: How & When To Use It." Sound on Sound, Mar. 1995, www.soundonsound.com/techniques/eq-how-when-use-it. (Year: 1995).*

(Continued)

*Primary Examiner* — Edgar X Guerra-Erazo

(57) ABSTRACT

Novel methods and systems for creating and using user profiles for dialog boost and sound equalizer adjustment to compensate for various ambient sound situations. For creating profiles when not at the ambient sound, a synthesized/
(Continued)

pre-recorded ambient noise can be mixed with the media to simulate the noise conditions.

13 Claims, 10 Drawing Sheets

(51) Int. Cl.
*G06F 3/16* (2006.01)
*G10L 21/0324* (2013.01)
*G10L 21/0364* (2013.01)

(58) Field of Classification Search
CPC . G10L 2021/02085; G10L 2021/02087; G10L 21/0216; G10L 2021/02161; G10L 2021/02163; G10L 2021/02165; G10L 2021/02166; G10L 2021/02168; G10L 21/0332; G10L 21/034; G10L 21/0208; G10L 21/0232; G10L 21/0224; G10L 21/0264; G10L 21/028; G10L 21/0308; G10L 21/0316; G10L 2021/0575; G10L 21/057; G06F 3/04847; G06F 3/165; G06F 3/16; G06F 3/162; G06F 3/167
See application file for complete search history.

(56) References Cited

U.S. PATENT DOCUMENTS 8,184,834 B2 * 5/2012 Oh .................... G10L 19/008 381/300
8,284,960 B2 * 10/2012 Vaudrey .................... H04R 5/04 381/119
9,923,536 B2 * 3/2018 Wang .................... G10L 25/51
10,158,337 B2 * 12/2018 Bongiovi .................... H04R 3/04
10,210,883 B2 * 2/2019 Geiger .................... H04S 3/008
2011/0125494 A1 * 5/2011 Alves .................... G10L 25/78 704/226
2011/0251704 A1 * 10/2011 Walsh .................... H04S 7/307 700/94
2013/0185066 A1 * 7/2013 Tzirkel-Hancock .................... G10L 21/003 381/71.4
2014/0369506 A1 * 12/2014 Arrasvuori .................... G01S 3/8083 381/17
2015/0281853 A1 * 10/2015 Eisner .................... H04R 25/505 381/312
2017/0223456 A1 8/2017 Ma
2017/0300289 A1 * 10/2017 Gattis .................... G10L 19/018
2018/0095718 A1 * 4/2018 Riedmiller .................... G06F 3/165
2019/0138269 A1 * 5/2019 Dolph .................... G06F 40/211
2020/0042285 A1 * 2/2020 Choi .................... H04R 3/04
2020/0264835 A1 * 8/2020 Reily .................... G06F 3/165
2020/0366991 A1 * 11/2020 Freeman .................... H04S 7/30

FOREIGN PATENT DOCUMENTS

CN 106464998 A 2/2017
CN 106797523 A 5/2017
CN 104900236 B 6/2020
EP 2070391 B1 11/2010
JP 2001086200 A 3/2001
JP 2001136239 A 5/2001
JP 2011505750 A 2/2011
JP 2014519274 A 8/2014
JP 2017529198 A 10/2017

OTHER PUBLICATIONS

Kotti, M. et al "Audio-Assisted Movie Dialogue Detection" IEEE Transactions on Circuits and Systems for Video Technology, vol. 18, No. 11, Nov. 2008, pp. 1618-1627.

* cited by examiner

SYSTEMS AND METHODS FOR ENHANCING AUDIO IN VARIED ENVIRONMENTS

CROSS-REFERENCE TO RELATED APPLICATIONS

The present application claims priority to International Patent Application No. PCT/CN2020/083083 filed 2 Apr. 2020; U.S. Provisional Patent Application No. 63/014,502 filed 23 Apr. 2020; and U.S. Provisional Patent Application No. 63/125,132 filed 14 Dec. 2020, which are incorporated herein by reference.

TECHNICAL FIELD

The present disclosure relates to improvements for the audio playback of media content. In particular, this disclosure relates setting and applying preferred noise compensation for the audio of media content being played in a variety of environments, particularly on mobile devices.

BACKGROUND

Audio playback for media with dialog (movies, televisions shows, etc.) are normally created to be enjoyed in a relatively quiet environment, such as at home or in a theater. However, it is becoming increasingly common for people to consume such content on-the-go with their mobile devices. This becomes an issue because it can be difficult to make out what the actors are saying when there is too much ambient noise (vehicle noise, crowds, etc.) or due to audio quality limitations of mobile hardware or type of audio playback (headphones, etc.) equipment used.

A common solution is to use noise-cancelling headphones/earbuds. However, this can be an expensive solution and has the downside of cutting out ambient noise that the user might want to hear (car horns, sirens, yelled warnings, etc.).

SUMMARY

Various audio processing systems and methods are disclosed herein. Some such systems and methods may involve creating and using audio adjustment profiles that are customized for the user and specific to different ambient conditions.

According to a first aspect, a method of configuring a mobile device for use with ambient noise for a user of the mobile device is described, the method comprising: receiving, from the user, a case identification of the ambient noise; receiving, from the user, a noise level for the ambient noise; receiving, from the user, a dialog boost level for the ambient noise at the noise level; receiving, from the user, a graphic equalizer setting for the ambient noise at the noise level; playing, from the mobile device, a sample audio for the user while the user sets the dialog boost level and the graphic equalizer setting; and storing on the mobile device the dialog boost level and graphic equalizer setting for the case identification at the noise level in a profile, wherein the device is configured to play audio media using the dialog boost level and graphic equalizer setting when the profile is selected by the user.

According to a second aspect, a method of adjusting audio for a mobile device for a user is described, the method comprising: receiving a profile selection from the user wherein the profile selection relates at least to an ambient noise condition; receiving a noise level of the ambient noise condition from the user; retrieving a dialog boost level and a graphic equalizer setting from memory on the mobile device; adjusting levels of the audio using the dialog boost level and the graphic equalizer setting.

Some or all of the methods described herein may be performed by one or more devices according to instructions (e.g. software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure may be implemented in a non-transitory medium having software stored thereon. The software may, for example, be executable by one or more components of a control system such as those disclosed herein. The software may, for example, include instructions for performing one or more of the methods disclosed herein.

At least some aspects of the present disclosure may be implemented via an apparatus or apparatuses. For example, one or more devices may be configured for performing, at least in part, the methods disclosed herein. In some implementations, an apparatus may include an interface system and a control system. The interface system may include one or more network interfaces, one or more interfaces between the control system and memory system, one or more interfaces between the control system and another device and/or one or more external device interfaces.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements, but different reference numbers do not necessarily designate different elements between different drawings.

BRIEF DESCRIPTION OF DRAWINGS

FIG. 5A shows the response curves for the speech segment of the output. FIG. 5B the response curves for the non-speech segment of the output.

FIG. 6A shows the response curves for the speech segment of the output. FIG. 6B the response curves for the non-speech segment of the output.

DETAILED DESCRIPTION

A solution to the problem of providing intelligible speech in media playback (audio or audio/visual) in a noisy environment (ambient noise) is described herein by creating and using dialog boost and equalizer settings in a profile for a particular user in a particular noise level and type (environment type).

The term "mobile device" as used herein refers to a device capable of audio playback and capable to be used in multiple locations by being carried on the person of the user. Examples include cell phones, laptop computers, tablet computers, mobile game systems, wearable devices, small media players, and the like.

The term "ambient condition" or "case" or "case identification" as used herein refers to a category of noisy location/environment that may or may not interfere with the enjoyment of listening to audio media on a mobile device. Examples include the home (e.g. "default"), outside in a populated area (e.g. walking), on public transportation, in a noisy indoor environment (e.g. airport), and others.

The term "dialog boost" refers to the application of a general sound amplification of speech components of audio with negligible amplification of the non-speech components. For example, dialog boost can be performed as an algorithm that continuously monitors the audio being played, detects the presence of dialog, and dynamically applies processing to improve the intelligibility of the spoken portion of audio content. In some embodiments, dialog boost analyzes features from the audio signal and applies a pattern-recognition system to detect the presence of dialogue from moment to moment. When speech is detected, the speech spectrum is altered where necessary to accentuate the speech content in a way that allows the listener to hear it more succinctly.

The term "equalization" or "graphic equalizer" or "GED" refers to frequency-based amplitude adjustment of audio. In a true GED, the amplitude settings would be set by sliders whose positions correspond to the frequency ranges they control, but herein GED also refers to a particular setting a graphic equalizer might have, giving a specific frequency response curve.

The term "media" or "content" as used herein refers to anything with audio content. This can be music, movies, videos, video games, telephone conversations, alerts, etc. In particular, the systems and methods herein are most useful for media that has a combination of speech and non-speech components, but the systems and methods can be applied to any media.

Figure 1:
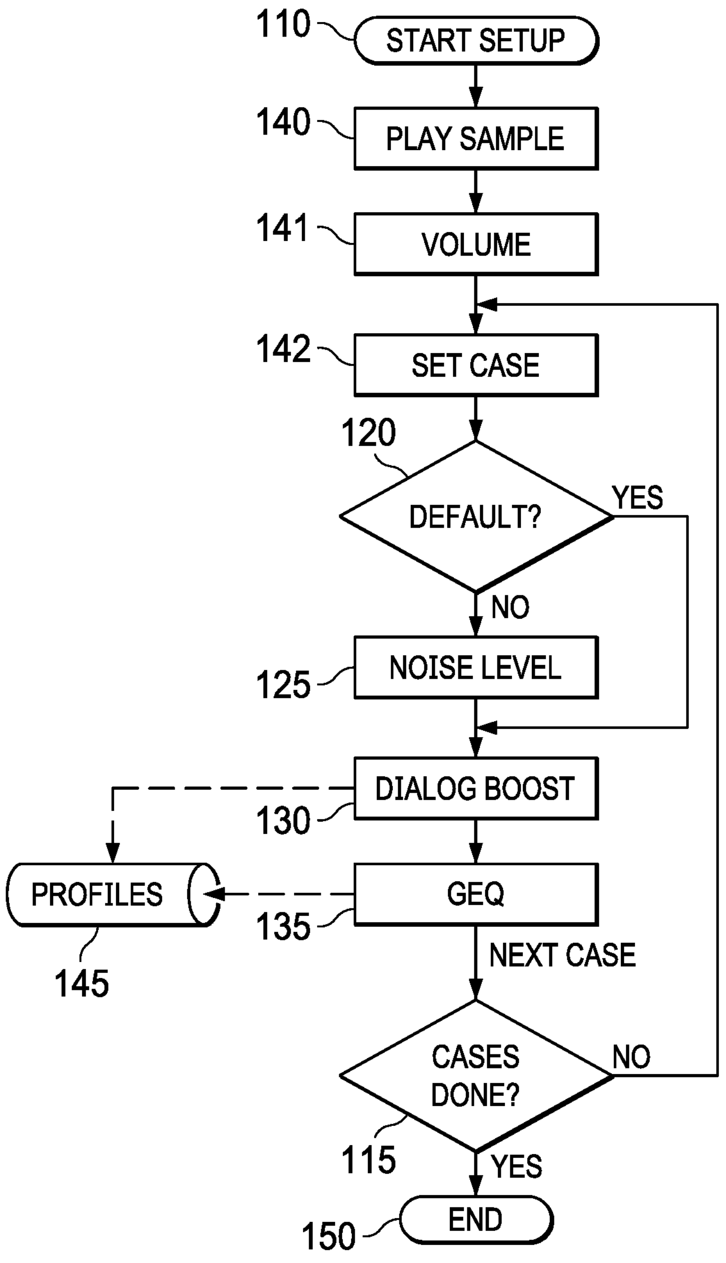
FIG. 1 illustrates an example flowchart for configuring case-specific audio settings.

FIG. 1 shows an example flowchart for creating profiles for different ambient conditions (cases). The user selects to start the setup 110 from the device user interface (UI) and a sample playback sample is played 140 for the user. This sample can be selected by system, or by the user. The user selects what volume 141 is played at. The user can then be taken through the different ambient noise cases 142 (default, walking, public transport, airport, etc.) either automatically or manually (user selected). The system can either go through all of the cases or just a select subset, including just one selected case. If the selected case is not a default case, then the user inputs an estimated ambient noise level 125 for their current situation, and a dialog boost level 130 and a graphic equalizer (GEQ) setting 135 that, in combination, gives the user an optimal listening experience in their subjective opinion. These settings 125,130, which can be done multiple times in any order (not necessarily in the order shown in the Figures), are set based on the sample playback 140 of audio with speech components. Once the dialog boost and GEQ settings 130,135 are set according to the user's preference, they are stored in a database/memory 145 of profiles for future use. The system can then determine if all applicable cases have been setup 115. If it is, the setup ends 150. If not, then the system can go to the next case 142 and repeat the settings process for that case. In some embodiments the settings profiles saved are also indexed based on the injected noise level 125.

In some embodiments, the dialog boost level and/or the GEQ setting are each one value from a short list of possible settings. For example, "3" from a range of 0-5. In some embodiments, the settings are a real value related to the setting, such as +10 dB (e.g. at a specific frequency range).

Figure 2:
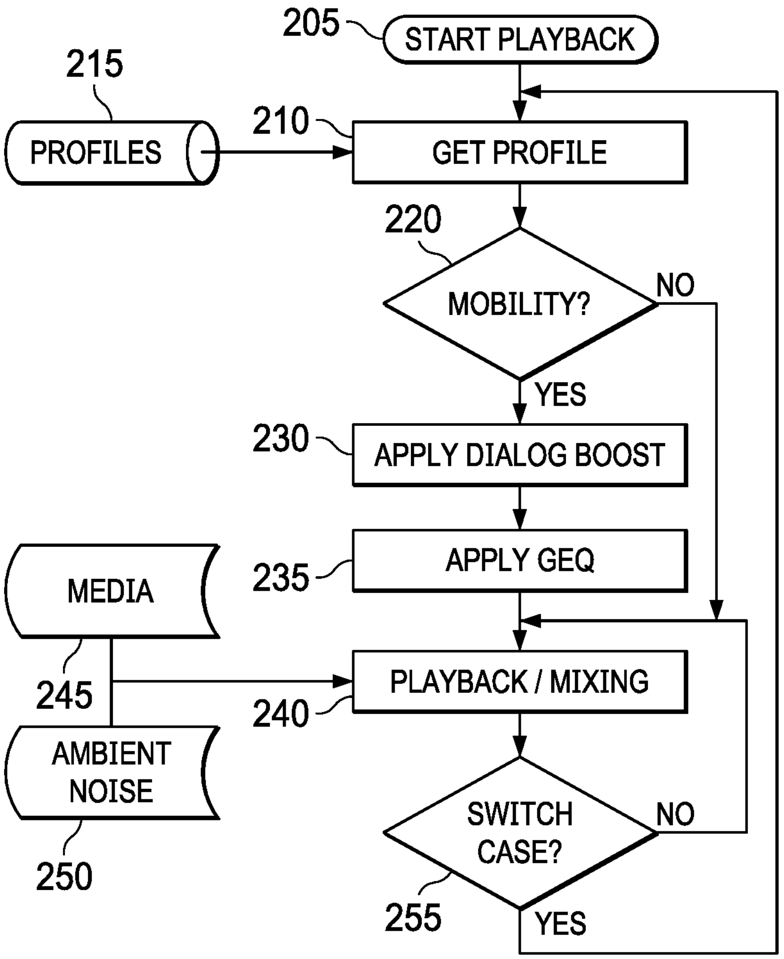
FIG. 2 illustrates an example flowchart for utilizing case-specific audio settings.

FIG. 2 shows an example flowchart for using created profiles according to methods described herein. The user starts their media 205 and selects the case profile 210 that best describes their current situation. If the profile is indexed based on ambient noise level, that can be selected as well. Then the system retrieves 210 the profile from a database/memory 215 matching the selected case (and, if applicable, noise level). The system then determines if the playback is in a mobility situation 220 (that is, a situation requiring dialog boost and GEQ adjustment). This determination can be from user input, device identification, location data, or other means. If the system determines that this is not a mobility situation, then normal playback/mixing 240 occurs from the media being played 245 in the presence of whatever the ambient noise 250 is for the user. This continues until the case profile is changed 255 at which point the new profile is retrieved 210 and the process begins again. In some embodiments, a new mobility status check is performed with or before the case switching 255 and the process only repeats if there is a mobility situation. If there is a mobility situation found 220, then dialog boost 230 and GEQ adjustments 235 are applied to the mixing 240 to adjust the media playback 245 to provide intelligible dialog in spite of the ambient noise 250.

Figure 3:
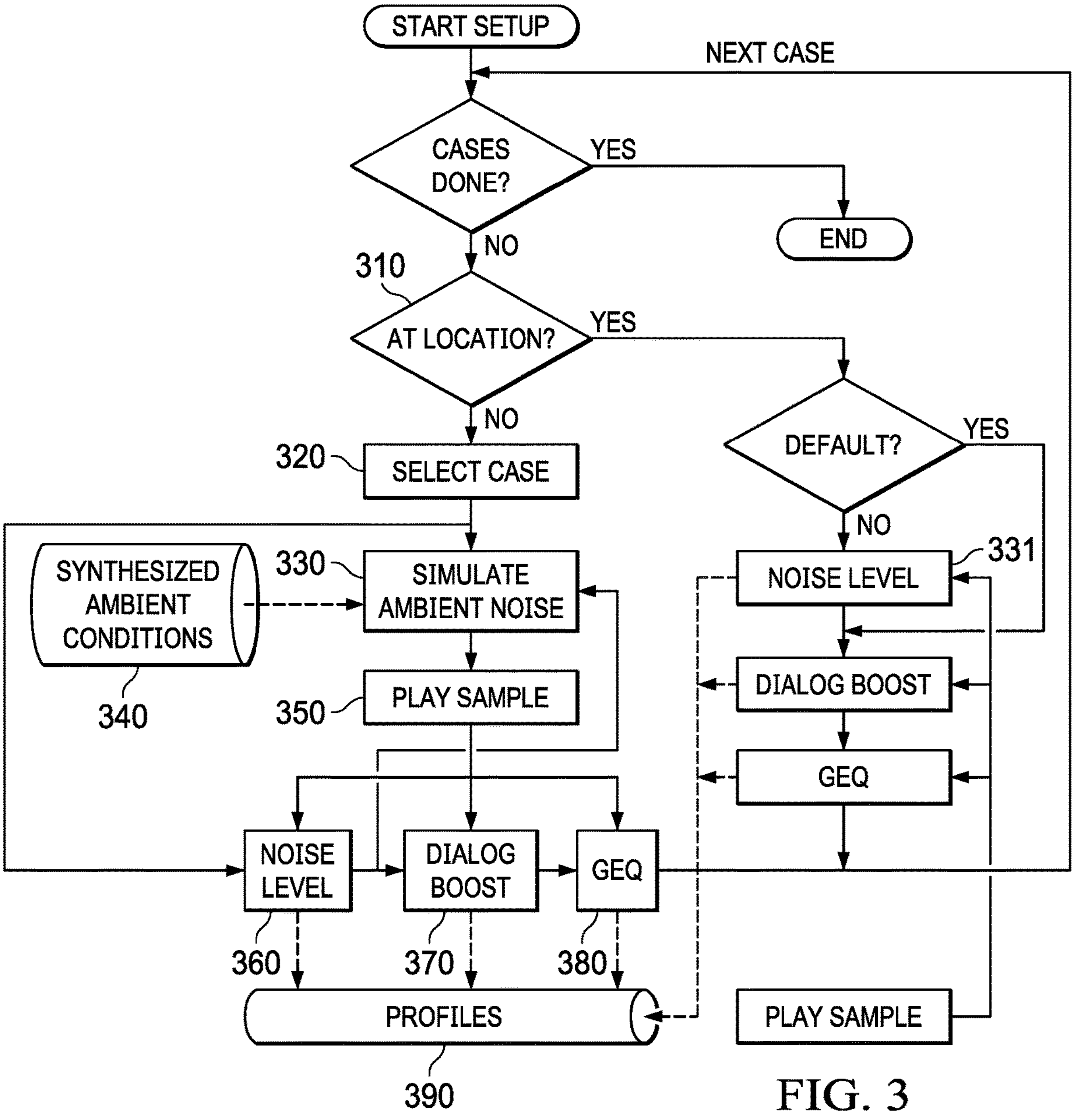
FIG. 3 illustrates an example flowchart for configuring case-specific audio settings including synthesizing the ambient noise.

FIG. 3 shows an example flowchart for creating a profile, including the use of synthesized ambient noise for virtual mixing of ambient noise with the media (as opposed to real mixing of actual ambient noise with the media, such as provided in FIGS. 1 and 2). The system is similar to that from FIG. 1, except that a check is done 310 to see if the user is creating the profile at the location of the noise or is pre-setting the case from a relatively noise-less environment (e.g. home). This check can be determined by querying the user or by location services determining the mobile device is at "home". In some embodiments, the system always assumes the user is in a relatively noise-less environment. If the user is not at the location, then a case (ambient noise condition) is selected 320, either by the user or the system. Ambient noise for that case is synthesized 330. In some embodiments, this can be or be based on a pre-recorded noise saved in a database/memory 340. This noise is added to the play sample 350, and a noise level 360 can be set by the user for the level they expect to experience, thereby adjusting the simulated noise 330. Dialog boost level 370 and GEQ level 380 can be set in the same manner as the at-location settings are performed. The settings are then saved to a database/memory 390 for future use. In some embodiments, the recorded ambient noise is taken from an ambisonic source and rendered into a binaural format.

Figure 4:
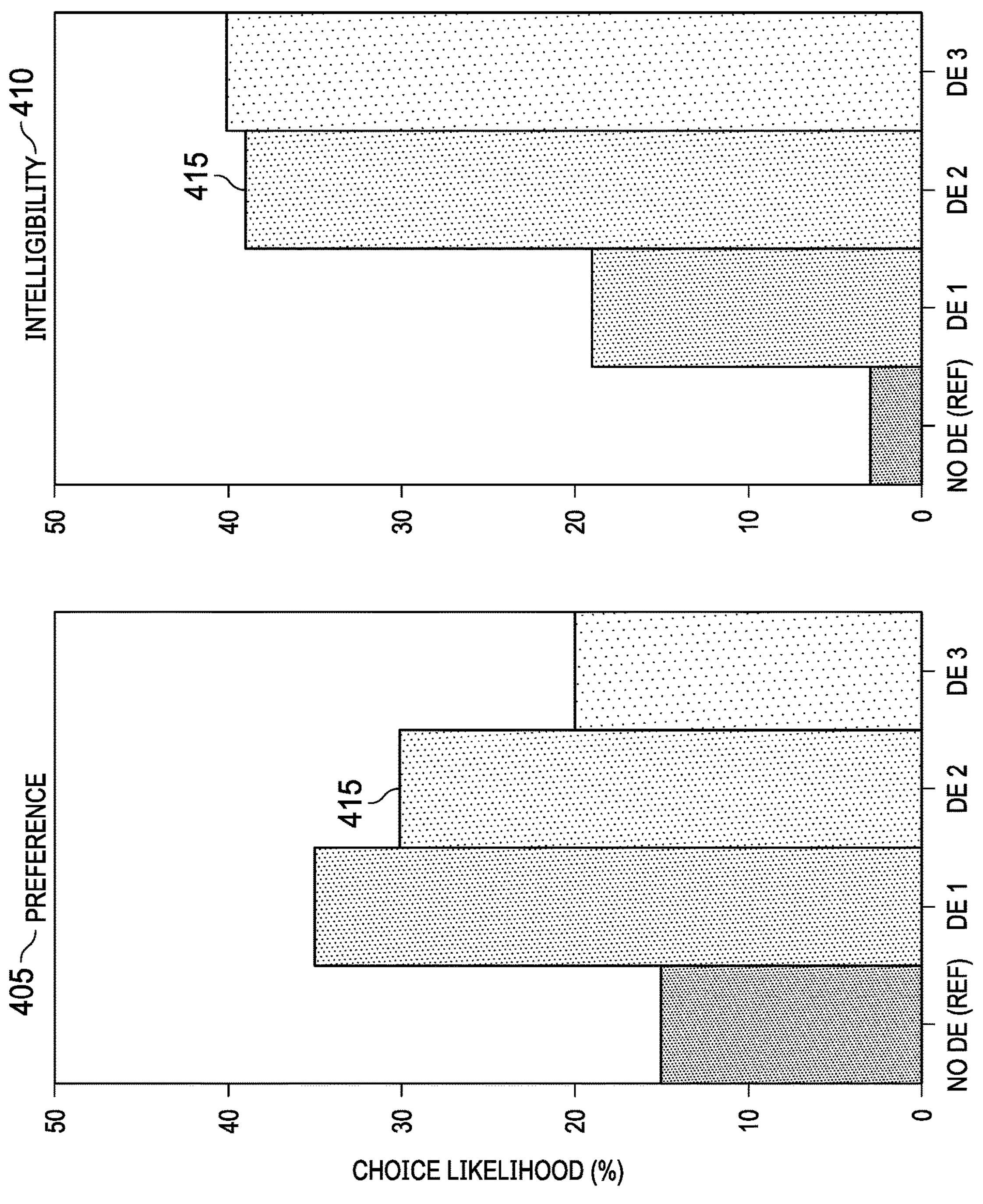
FIG. 4 illustrates an example comparison of non-adjusted and adjusted audio obtained by subjective testing experiments.

FIG. 4 shows an example of the perceptual differences the system can make and how comparisons made against a reference condition can be used to assess performance. As it can be seen, dialog boost is preferred over a reference condition of no boost and increases the intelligibility of the dialog, making the adjustments beneficial to the user for media where understanding the dialog is important. For example, FIG. 4 shows that a dialog enhancement (DE) of level "2" 415 shows a high level of user preference 405 and subjective intelligibility 410, and so might be a preferred setting for most users.

Figure 5A:
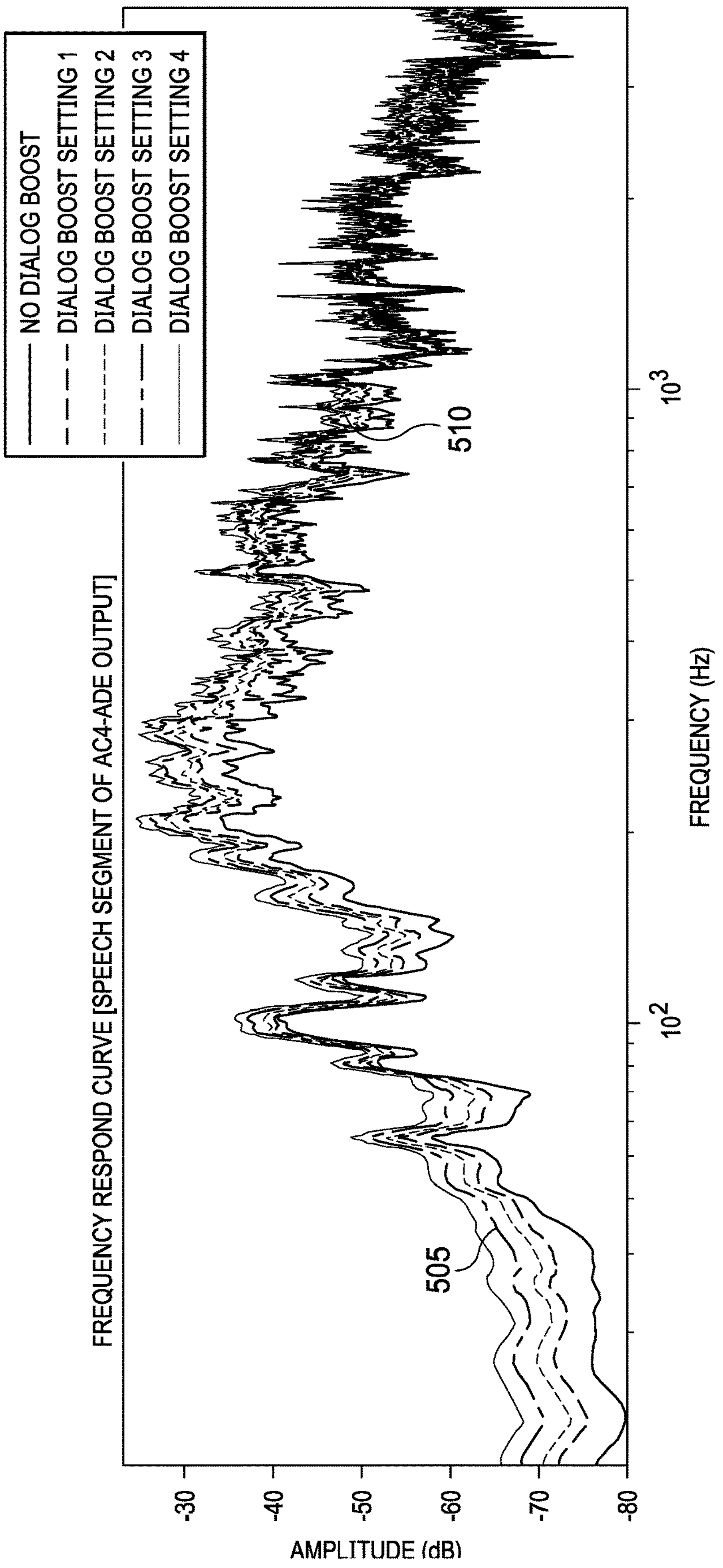
FIGS. 5A and 5B illustrate example frequency response curves for dialog boost applied to one type of codec.
Figure 5B:
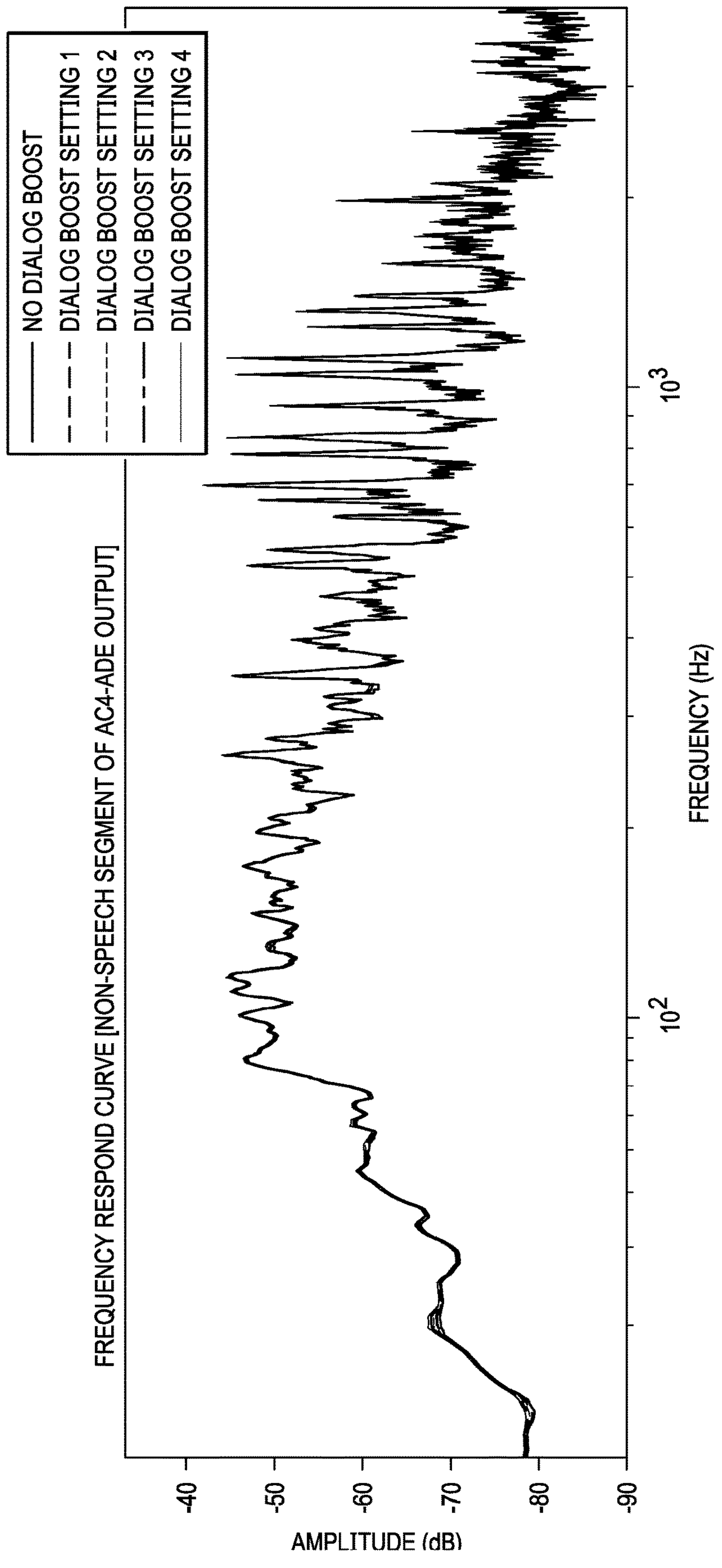
Figure 6A:
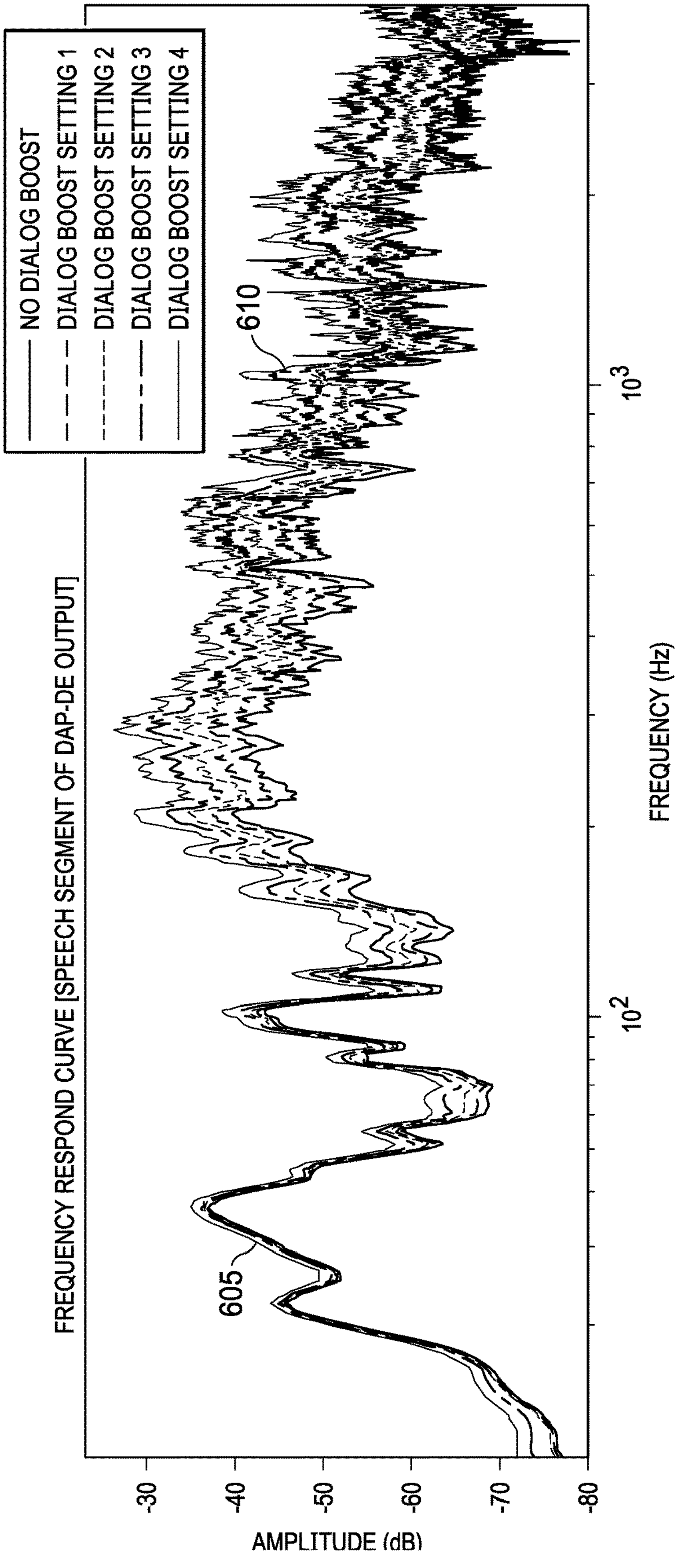
FIGS. 6A and 6B illustrate example frequency response curves for dialog boost applied to a different type of codec than FIGS. 5A and 5B.
Figure 6B:
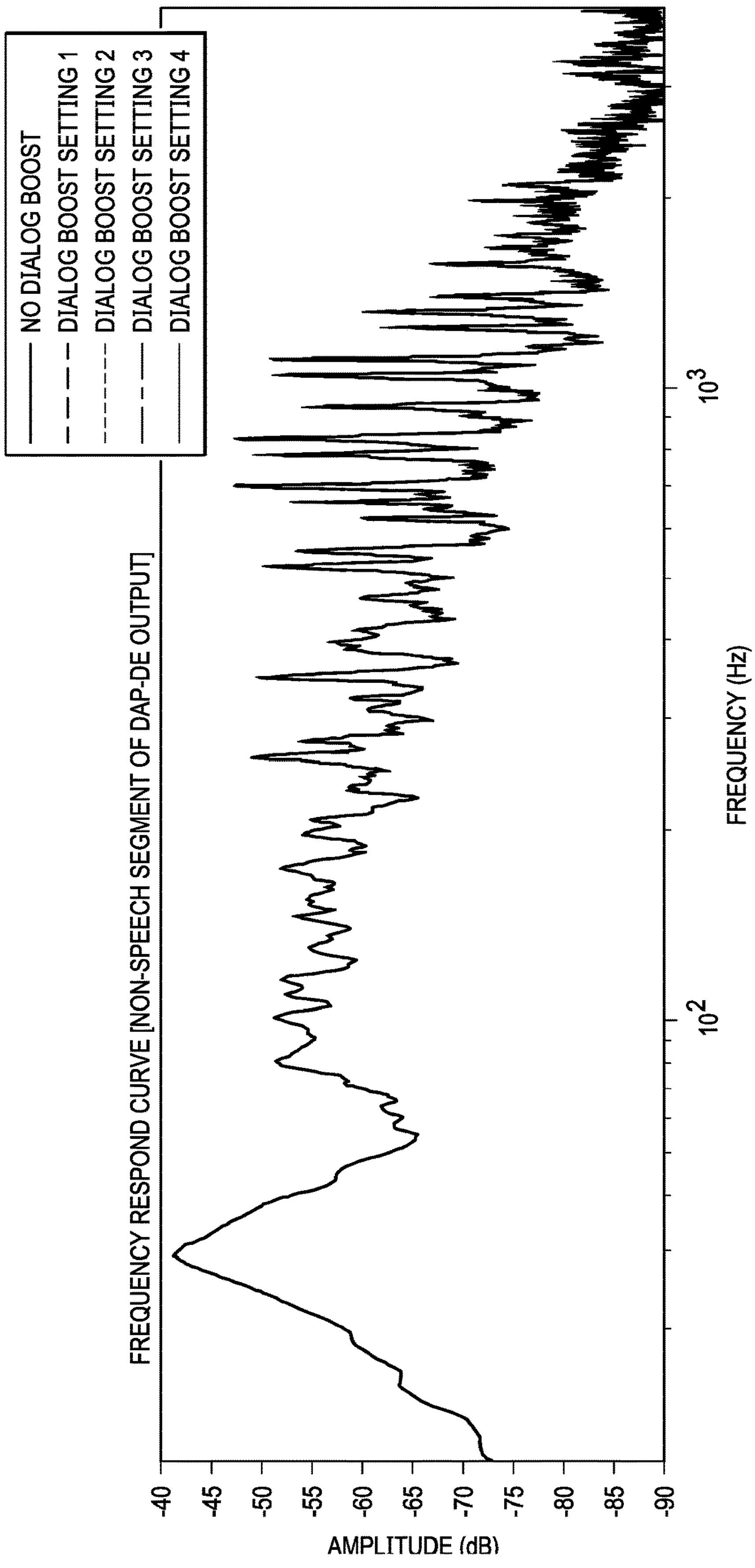

FIGS. 5A and 5B and 6A and 6B show example graphs for dialog boost. FIGS. 5A and 5B show graphs of different dialog boost settings for the speech component of the media. As shown, the different settings show distinct curves. In contrast, FIGS. 5B and 6B show graphs for the same different dialog boost settings but for the non-speech component of the media, where there is negligible difference between the curves for the different settings (i.e. the dialog boost does not boost non-speech components). FIGS. 5A and 5B represent dialog boost levels with smaller intervals between levels than FIGS. 6A and 6B. Different curves can be used depending on how noisy the environment is: the noisier the ambient noise is, the more aggressive the curve can be in terms of having more dialog boost on overall playback content. FIG. 5A shows response curves where the dialog boost levels show, for the speech components of the audio, a strong boost in low frequencies 505 compared to higher frequencies 510. In contrast, FIG. 6A shows a strong boost in higher frequencies 610 compared to lower frequencies 605. In both cases, FIGS. 5B and 6B show that the non-speech components have negligible boost across all frequencies.

Figure 7:
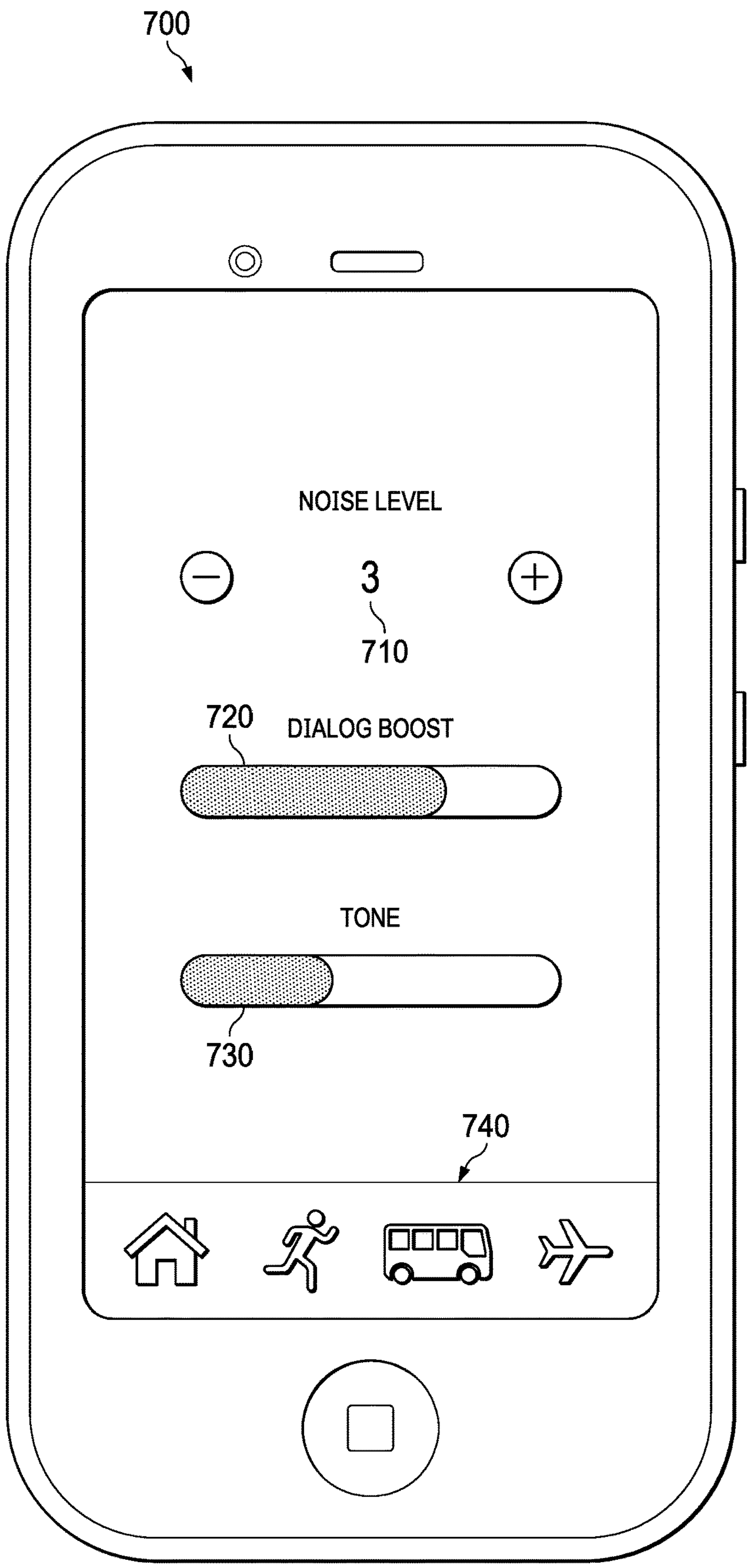
FIG. 7 shows an example graphical user interface for the methods herein.

FIG. 7 shows an example UI (specifically in this case a graphical user interface, GUI) for setting the profiles. On a mobile device 700 the input for the setting can be presented in a simplified form for ease of use. A noise level control 710 can be presented as a finite number (e.g. 0-5) of noise levels, for example from 0 as no noise with increasing values as increasing noise levels in even increments (either in actual dB or perceptual steps). The dialog boost setting 720 can be presented as a graphical slider from no boost to maximum boost. Likewise, the GEQ setting 730 can be simplified into a single range of one value (here shown as a slider) to select preset GEQ settings (e.g. corresponding to "bright", "flat", "deep", etc. tones). The cases 740 can be shown as icons (with or without text). For example, "default" can be shown as a house, "walking" can be shown with a person, "public transportation" can be shown as a train or bus, and "indoor venue" can be shown with an airplane (to indicate an airport). Other cases and icons can be used, such that the icon provides the user with a quick reference to the case it represents.

Figure 8:
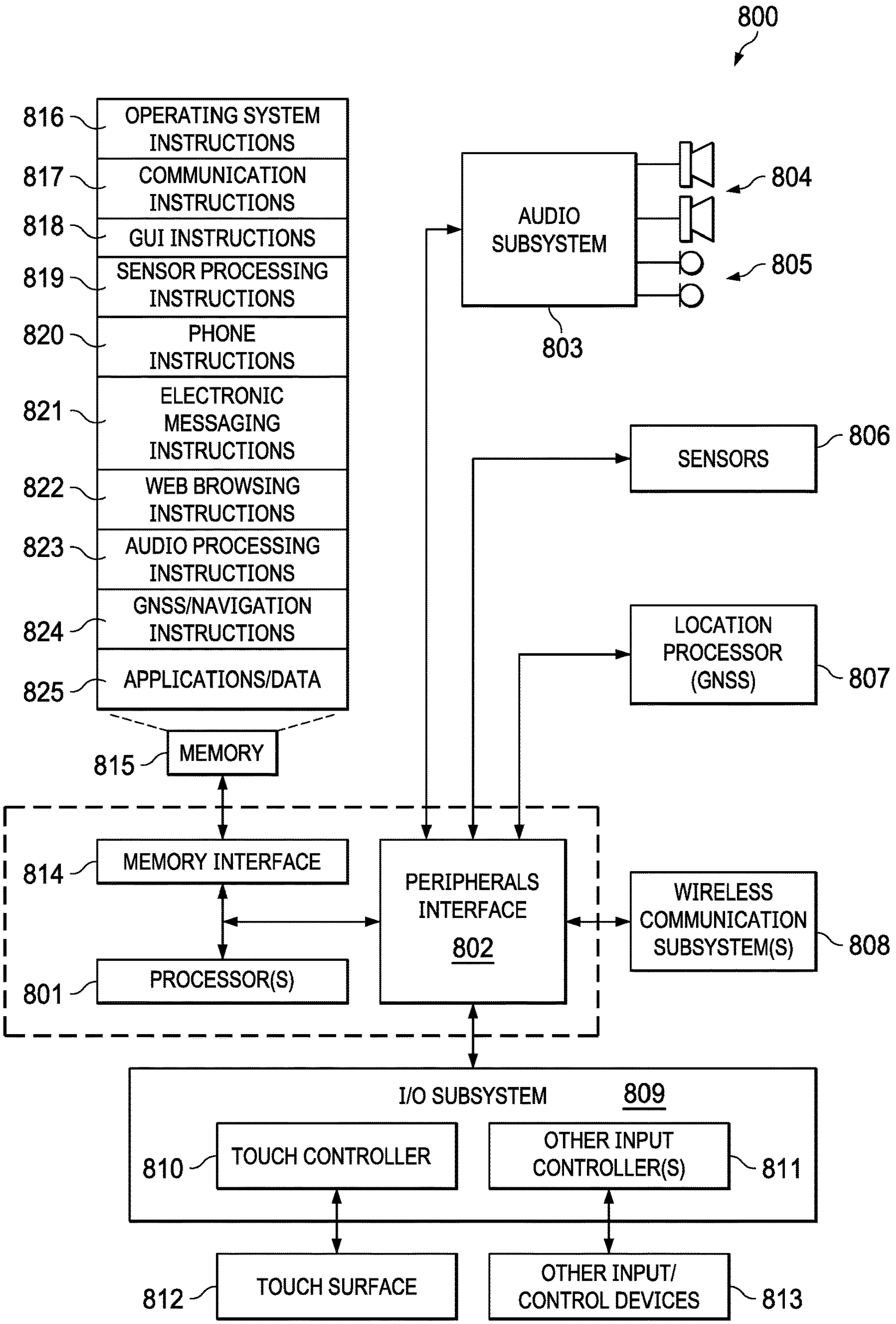
FIG. 8 shows an example hardware/software configuration for the methods herein.

FIG. 8 shows an example mobile device architecture for implementing the features and processes described herein, according to an embodiment. Architecture 800 can be implemented in any electronic device, including but not limited to: a desktop computer, consumer audio/visual (AV) equipment, radio broadcast equipment, mobile devices (e.g., smartphone, tablet computer, laptop computer, wearable device). In the example embodiment shown, architecture 800 is for a smart phone and includes processor(s) 801, peripherals interface 802, audio subsystem 803, loudspeakers 804, microphone 805, sensors 806 (e.g., accelerometers, gyros, barometer, magnetometer, camera), location processor 807 (e.g., GNSS receiver), wireless communications subsystems 808 (e.g., Wi-Fi, Bluetooth, cellular) and I/O subsystem(s) 809, which includes touch controller 810 and other input controllers 811, touch surface 812 and other input/control devices 813. Memory interface 814 is coupled to processors 801, peripherals interface 802 and memory 815 (e.g., flash, RAM, ROM). Memory 815 stores computer program instructions and data, including but not limited to: operating system instructions 816, communication instructions 817, GUI instructions 818, sensor processing instructions 819, phone instructions 820, electronic messaging instructions 821, web browsing instructions 822, audio processing instructions 823, GNSS/navigation instructions 824 and applications/data 825. Audio processing instructions 823 include instructions for performing the audio processing described herein. Other architectures with more or fewer components can also be used to implement the disclosed embodiments.

The system can be provided as a service driven from a remote server, as a standalone program on the device, integrated into a media player application, or included as part of the operating system as part of its sound settings.

A number of embodiments of the disclosure have been described. Nevertheless, it will be understood that various modifications may be made without departing from the spirit and scope of the present disclosure. Accordingly, other embodiments are within the scope of the following claims.

As described herein, an embodiment of the present invention may thus relate to one or more of the example embodiments, which are enumerated below. Accordingly, the invention may be embodied in any of the forms described herein, including, but not limited to the following Enumerated Example Embodiments (EEEs) which described structure, features, and functionality of some portions of the present invention:

EEE1: A method of configuring a mobile device for use with ambient noise for a user of the mobile device, the method comprising: receiving, from the user, a case identification of the ambient noise; receiving, from the user, a noise level for the ambient noise; receiving, from the user, a dialog boost level for the ambient noise at the noise level; receiving, from the user, a graphic equalizer setting for the ambient noise at the noise level; playing, from the mobile device, a sample audio for the user while the user sets the dialog boost level and the graphic equalizer setting; and storing on the mobile device the dialog boost level and graphic equalizer setting for the case identification at the noise level in a profile, wherein the device is configured to play audio media using the dialog boost level and graphic equalizer setting when the profile is selected by the user.

EEE2. The method of EEE1, further comprising: simulating the ambient noise at the noise level; and mixing the simulated ambient noise with the sample audio prior to the playing the sample audio.

EEE3. The method of EEE2, wherein the simulating includes retrieving a stored pre-recorded ambient noise from a memory.

EEE4. The method of EEE3, wherein the stored pre-recorded ambient noise is in binaural format.

EEE5. The method of any of EEE1 to EEE4, further comprising: presenting, on the mobile device, a graphical user interface control for setting the case identification, the noise level, the dialog boost level, and the graphic equalizer setting.

EEE6. The method of any of EEE1 to EEE5, wherein the profile corresponds to both the case identification and the noise level.

EEE7. A method of adjusting audio for a mobile device for a user, the method comprising: receiving a profile selection from the user wherein the profile selection relates at least to an ambient noise condition; receiving a noise level of the ambient noise condition from the user; retrieving a dialog boost level and a graphic equalizer setting from memory on the mobile device; adjusting levels of the audio using the dialog boost level and the graphic equalizer setting.

EEE8. The method of EEE7, further comprising presenting, on the mobile device, a graphical user interface control for selecting a profile corresponding to an ambient noise condition.

EEE9. A device configured to run in software or firmware at least one of the methods of EEE1 to EEE8.

EEE10. A non-transient computer-readable medium that, when read by a computer, instructs the computer to perform at least one of the methods of EEE1 to EEE8.

EEE11. The device of EEE9, wherein the device is a phone.

EEE12. The device of EEE9, wherein the device is at least one of: a cell phone, a laptop computer, a tablet computer, a mobile game system, a wearable device, and a small media player.

EEE13. The device of any of EEE9, EEE11, or EEE12, wherein the software or firmware is part of the operating system of the device.

EEE14. The device of any of EEE9, EEE11, or EEE12, wherein the software or firmware runs a stand-alone program on the device.

EEE15. The method of any of EEE1 to EEE8, wherein the method is performed by an operating system of mobile device.

The present disclosure is directed to certain implementations for the purposes of describing some innovative aspects described herein, as well as examples of contexts in which these innovative aspects may be implemented. However, the teachings herein can be applied in various different ways. Moreover, the described embodiments may be implemented in a variety of hardware, software, firmware, etc. For example, aspects of the present application may be embodied, at least in part, in an apparatus, a system that includes more than one device, a method, a computer program product, etc. Accordingly, aspects of the present application may take the form of a hardware embodiment, a software embodiment (including firmware, resident software, microcodes, etc.) and/or an embodiment combining both software and hardware aspects. Such embodiments may be referred to herein as a "circuit," a "module", a "device", an "apparatus" or "engine." Some aspects of the present application may take the form of a computer program product embodied in one or more non-transitory media having computer readable program code embodied thereon. Such non-transitory media may, for example, include a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Accordingly, the teachings of this disclosure are not intended to be limited to the implementations shown in the figures and/or described herein, but instead have wide applicability.

What is claimed is:

1. A computer-implemented method of configuring a mobile device for a user of the mobile device, the method comprising:

providing, to the user, a graphical user interface (GUI) for the configuring;

receiving, through the GUI, a case identification indicating an ambient condition selected by the user;

receiving, through the GUI, an expected ambient noise level for the case identification selected by the user;

simulating noise at the expected ambient noise level for the case identification producing simulated ambient noise;

mixing the simulated ambient noise with a sample audio producing a mixed sample audio;

receiving, through the GUI, a dialog boost level selected by the user for the case identification;

receiving, through the GUI, a graphic equalizer setting selected by the user for the case identification;

playing, from the mobile device, the mixed sample audio for the user while the user sets, through the GUI, the dialog boost level and the graphic equalizer setting according to a subjective optimization by the user; and storing on the mobile device the dialog boost level and graphic equalizer setting for the case identification at the expected ambient noise level in a profile related to the case identification, wherein the device is configured to play audio media using the dialog boost level and graphic equalizer setting when the profile is selected by the user.

2. The method of claim 1, wherein the simulating includes retrieving a stored pre-recorded ambient noise from a memory.

3. The method of claim 2, wherein the stored pre-recorded ambient noise is in binaural format.

4. The method of claim 1, wherein the profile corresponds to both the case identification and the expected ambient noise level.

5. The method of claim 1, further comprising:

receiving a profile selection from the user wherein the profile selection relates at least to an ambient noise condition;

receiving a noise level of the ambient noise condition;

retrieving a dialog boost level and a graphic equalizer setting from memory on the mobile device based on the profile selection; and adjusting levels of audio on the mobile device using the dialog boost level and the graphic equalizer setting.

6. The method of claim 5, further comprising presenting, on the mobile device, a graphical user interface control for selecting a profile corresponding to an ambient noise condition.

7. A device configured to run in software or firmware the method of claim 1.

8. A non-transitory computer-readable medium that, when read by a computer, instructs the computer to perform the method of claim 1.

9. The device of claim 7, wherein the device is a phone.

10. The device of claim 7, wherein the device is at least one of: a cell phone, a laptop computer, a tablet computer, a mobile game system, a wearable device, and a small media player.

11. The device of claim 7, wherein the software or firmware is part of the operating system of the device.

12. The device of claim 7, wherein the software or firmware runs a stand-alone program on the device.

13. The method of claim 1, wherein the method is performed by an operating system of a mobile device.

* * * * *